United States Patent [19]

Perris

[11] 4,072,268
[45] Feb. 7, 1978

[54] HEATING CONTROL SYSTEM

[75] Inventor: James Perris, Bloomfield, N.J.

[73] Assignee: The James Perris Co., Inc., Bloomfield, N.J.

[21] Appl. No.: 676,789

[22] Filed: Apr. 14, 1976

[51] Int. Cl.$^2$ .............................................. G05B 11/06
[52] U.S. Cl. ................................... 236/78 C; 236/94; 318/596
[58] Field of Search ................ 236/91 G, 78 C, 19 L; 251/131, 133; 318/596, 290

[56] References Cited

U.S. PATENT DOCUMENTS

| 2,173,798 | 9/1939 | Baak .................................. 236/78 C |
| 2,477,728 | 8/1949 | Fitzgerald ..................... 236/91 G X |
| 2,743,403 | 4/1956 | Wernlund ..................... 236/78 C X |
| 2,755,421 | 7/1956 | Roosdorp ...................... 236/78 C X |
| 3,165,681 | 1/1965 | Pinckaers ...................... 236/78 C X |
| 3,391,317 | 7/1968 | Bell ...................................... 318/18 |
| 3,586,027 | 6/1971 | Fitzgerald, Jr. .................. 251/133 X |
| 3,664,358 | 5/1972 | Kosugi et al. ................... 251/131 X |
| 3,697,841 | 10/1972 | Nystuen ........................... 318/290 X |
| 3,752,189 | 8/1973 | Marr et al. ...................... 251/131 X |

OTHER PUBLICATIONS

Industrial Electronics Handbook–Cockrell, McGraw–Hill, 1965, pp. 2-8, 2-10, 2-11.

*Primary Examiner*—William E. Wayner
*Attorney, Agent, or Firm*—Blum, Moscovitz, Friedman & Kaplan

[57] ABSTRACT

A heating control system for automatically controlling the temperature within a space is provided. The heating control system includes a temperature sensor for detecting changes in temperature without the space and in response thereto producing a control signal having a substantially linearly variable potential, the increase or decrease in the variable potential being directly varied in response to changes in temperature without the space. A heat supply includes a control valve adapted to be selectively opened to increase the rate at which heat is supplied to the space and be selectively closed to decrease the rate at which the heat is supplied to the space. A rheostat having a shiftable contact is coupled to the control valve and is disposably controlled thereby to produce a variable reference feedback signal having a substantially linearly variable potential in response to the selective opening and closing of the control valve. Comparator circuitry compares the potential of the variable control signal to the potential of the variable reference feedback signal and in response to the potential of the variable control signal being greater than the potential of the variable reference signal applies a closing signal to the control valve to effect decreasing of the rate at which same supplies heat to the space and in response to the potential of the control signal being below the variable reference potential applies an opening signal to the control valve to decrease the set rate of heat supplied to the space.

15 Claims, 3 Drawing Figures

HEATING CONTROL SYSTEM

BACKGROUND OF THE INVENTION

This invention is directed to a heating control system for automatically controlling the temperature within a space, and in particular to a closed loop electronic heating control system having a thermistor as a linearly variable temperature sensor defining an open loop input for controlling the set rate at which heat is supplied to the space.

Heretofore, heating control systems for automatically controlling the temperature within a space have included resistance bridge circuits for controlling the rate at which heat is supplied to a space. Such systems usually include a heat balancer and one or two additional temperature sensors. A heat balancer includes a pair of temperature responsive resistance elements and a heating steam coil. A first temperature responsive resistance element is positioned in the path of the air flowing to the coil and the further temperature resistance element is positioned in the path of air flowing from the coil. The difference in the air temperatures, as represented by difference in the resistances of the respective temperature sensitive elements, constitutes an accurate indication of the amount of heat being added to the air passing through the heat convector unit. In addition to the temperature responsive resistance elements in the heat balancer, a temperature responsive resistance thermostat, for measuring outdoor and/or indoor temperatures is included in a balanced bridge circuit with the temperature responsive resistance elements of the heat balancer to produce control signals to be applied to a control valve in order to control the rate at which heat is supplied to the space.

The balanced bridge circuit formed by the respective temperature responsive resistance elements is coupled to the control valve motor and is maintained in a balanced condition by being coupled to the control valve motor, to thereby define a closed loop control system. Such a system is illustrated and described in U.S. Pat. No. 3,054,562 (Werts), and has been found to be less than completely satisfactory.

SUMMARY OF THE INVENTION

Generally speaking, in accordance with the instant invention, an electronic heating control system for automatically controlling the temperature within a space is provided. The heating control system includes a temperature sensor for detecting changes in temperature without the space and in response thereto being adapted to produce a control signal having a substantially linearly variable potential, the increase or decrease in potential being linearly varied in response to changes in temperature without the space. A heat supply includes a control valve adapted to be selectively opened to increase the rate at which heat is supplied to the space and selectively closed to decrease the rate at which heat is supplied to the space. The heat supply further includes a rheostat having a shiftable contact coupled to the control valve and disposably controlled thereby to produce a variable reference feedback signal having a substantially linearly variable potential, the potential of said reference feedback signal being linearly variable in response to the selective opening and closing of the control valve. Comparator circuitry effects a comparison of the potential of the variable control signal with the potential of the variable reference signal and in response the potential of the variable control signal being greater than the potential of the variable reference feedack signal effects an application of a closing signal to the control valve to thereby decrease the rate at which heat is supplied to the space, and in response to the potential of the variable control signal being less than the potential of the variable reference signal, the comparator circuitry effects an opening of the control valve to thereby decrease the set rate of heat supplied to the space.

Accordingly, it is an object of the instant invention to provide an improved closed loop heating control system having an open-loop input for automatically controlling the temperature within a space.

A further object of the instant invention is to provide an improved heating control system for automatically controlling the rate at which heat is supplied to the space by sensing temperature without the space.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
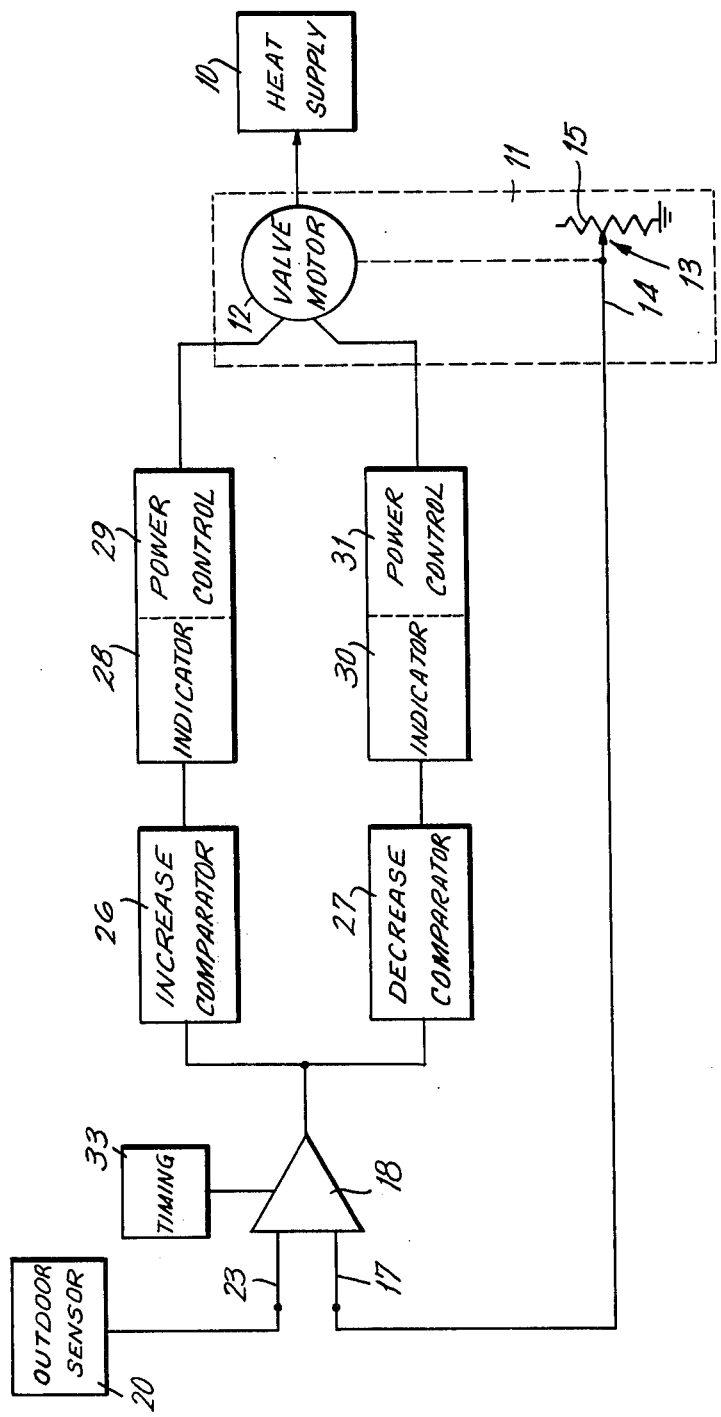
FIG. 1 is a block circuit diagram of a heating control system constructed in accordance with a preferred embodiment of the instant invention.
Figure 2:
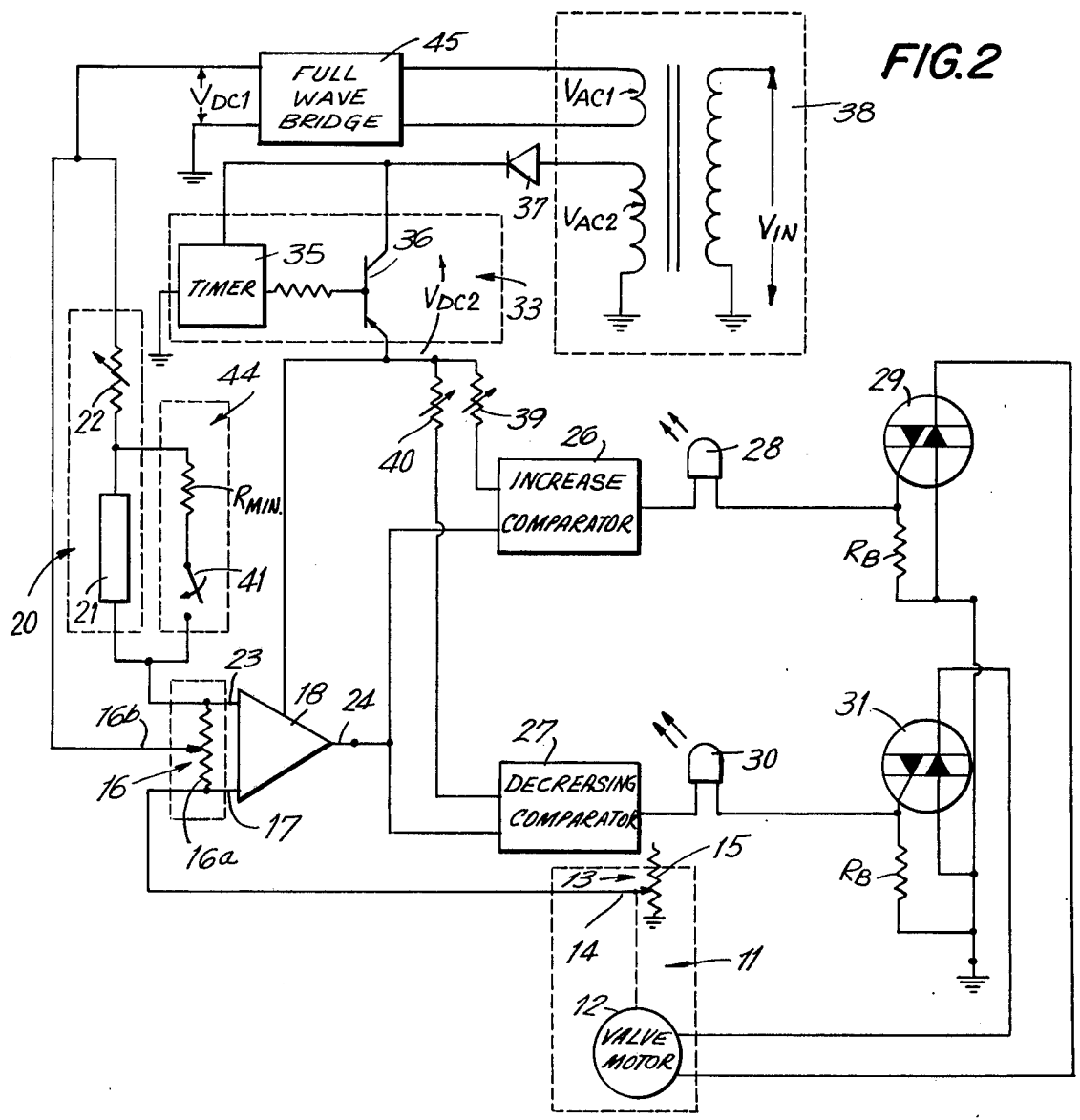
FIG. 2 is a detailed circuit diagram of the heating control system depicted in FIG. 1.

Reference is now made to FIGS. 1 and 2, wherein a heating control system for automatically controlling the rate at which heat is supplied to a space is depicted. A heat supply, generally indicated as 10, such as a convector, to which steam is supplied through a valve assembly, generally indicated as 11, supplies the amount of low pressure steam to be introduced to the space to effect heating thereof. The valve assembly includes a valve motor 12 and a rheostat, generally indicated as 13, which rheostat is controlled by the selective opening and closing of the valve motor to control the rate at which heat is supplied to the space.

The rheostat 13 includes a movable contact 14 and a fixed resistor 15, the movable contact 14 being coupled (illustrated by a dashed line) to the valve motor 12 to be displaced in a first direction in response to an opening of the valve motor and in a second direction in response to a closing of the valve motor. The movable contact 14 is coupled to a reference feedback input 17 of an operational amplifier 18 so that the impedance seen by the reference feedback input 17 of the operational amplifier is varied in response to opening and closing of the control valve.

The control system of the instant invention utilizes a single outdoor sensor, generally indicated as 20, comprised of a thermistor 21 and a variable resistor 22 coupled to a DC supply $V_{DC1}$ for detecting the outdoor temperature and providing a control signal to a control input 23 of the operational amplifier 18. The thermistor 21 is only responsive to temperature changes without the space and, hence, is not selfcorrecting and therefore defines an open loop input to the closed loop control system. Specifically, the variable resistor 22 effects adjustment of the thermistor so that the impedance seen by the control input 23 of the operational amplifier 18 is linearly variable over the range of temperatures to be detected. By properly biasing the thermistor, a one degree change in outdoor temperature will effect a change in resistance of approximately 13 ohms and approximately 1.5 mv. Accordingly, the reference feedback input 17 and control input 23 to the operational amplifier 18 are substantially linearly variable potential signals.

Figure 3:
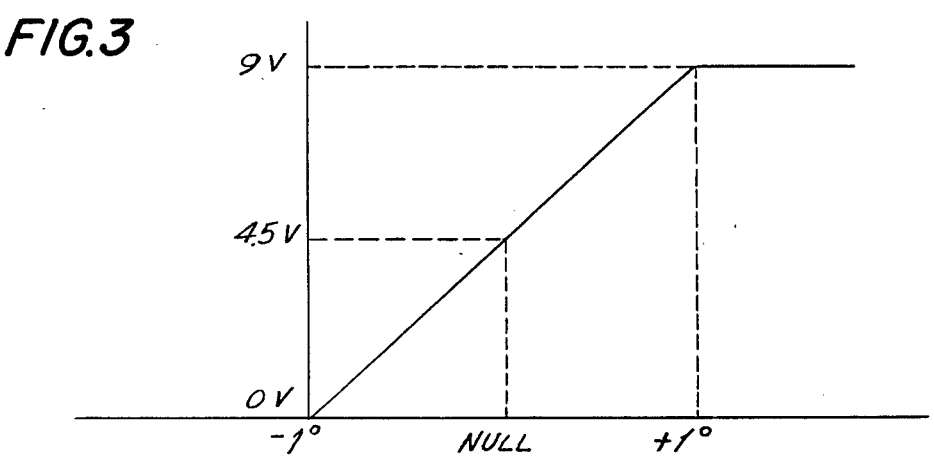
FIG. 3 is a graphical illustration of the output characteristic of an amplifier utilized in the control system depicted in FIG. 1.

Referring specifically to FIG. 3, the operating characteristic of the operational amplifier 18 is illustrated. A null condition of the operational amplifier is determined by a compensating circuit, generally indicated as 16. Specifically, the compensating circuit includes resistor 16a and slidable contact 16b, slidable contact 16b being referenced to a voltage $V_{DC1}$ for selecting a null condition of the amplifier at which the output is referenced to a predetermined potential, illustrated in FIG. 3 for explanatory purposes to be 4.5 V. Accordingly, if the mV potential applied to the control input 23 of the operational amplifier 18 is equal to the potential applied to the reference input 17, the operational amplifier continues to produce a 4.5 V output. However, if the outdoor temperature increases or decreases, as noted above, a corresponding linear increase or decrease in the resistance of the thermistor seen by the operational amplifier 18, at the control input 23, causes the control input to be referenced to a higher or lower potential than the potential applied by the rheostat to the reference input 17, thereby causing the operational amplifier to produce an output signal having a potential higher than 4.5 volts or lower than 4.5 volts in response to a change in temperature detected by the outdoor temperature sensor.

The output terminal 24 of the operational amplifier is coupled to a temperature increase comparator 26 and a temperature decrease comparator 27. If the temperature increases, thereby raising the output of the operational amplifier above the null condition, the temperature increase comparator detects the increase and applies a signal through an indicator lamp 28 to a power control closing circuit 29, which power control closing circuit 29 effects a closing of the valve motor 12. Similarly, if a decrease in the output potential of the operational amplifier is detected by the temperature decrease comparator, the temperature decrease comparator applies a signal through the indicator lamp 30 to power control opening circuit 31, which circuit applies an opening signal to the valve motor to thereby effect opening of same to thereby increase the set rate at which heat is supplied to the space by the heat supply.

Referring specifically to FIG. 2, a timing circuit 33 is disposed intermediate the power supply 38 and the operational amplifier 18 and comparators 26 and 27, to selectively gate power to the operational amplifier 18 and comparators 26 and 27 to thereby provide a timing cycle for preventing system override, and for reducing the effects of sudden heating load level changes in the system. The timing circuit 33 includes a timer 35 and power transistor, generally indicated as 36, having its collector-emitter path coupled in series to the power supply 38. Specifically, an AC signal $V_{IN}$ is converted to a first DC voltage $V_{DC1}$ by a transformer coil illustrated as $V_{AC1}$ and full wave rectifier bridge 45 and is also converted to a second DC voltage $V_{DC2}$ by coil $V_{AC2}$ and half wave rectifier 37. The voltage $V_{DC2}$ is coupled through the collector-emitter path of power transistor 36 to the operational amplifier 18 and comparators 26 and 27 and is selectively applied thereto in response to the power transistor 36 being turned ON by the timer 35. In a preferred embodiment, a timing cycle wherein the transistor is turned ON for four seconds and OFF for 24 seconds to control the set rate at which heat is supplied to the space, is particularly effective in preventing override, and reducing the likelihood of overload on the heat supply caused by possible surges in the system. An astable multi-vibrator having two distinct time frequencies so as to permit variation in the respective periods, namely, the period over which the power switching transistor is OFF and the period over which the power transistor is ON is a particularly effective timer, however, the instant invention is not limited thereto.

As is further illustrated in FIG. 2, the comparators 26 and 27 are respectively coupled through variable resistors 39 and 40 to the power supply to thereby selectively reference the respective voltages of the comparator circuits to be compared with the output of the operational amplifier. Additionally, indicators 28 and 30 are preferably formed of light emitting diodes and effect a coupling of the comparators 26 and 27 to triacs 29 and 31 respectively, which triacs are particularly suited for use as the power control closing and opening circuit elements. It is noted that the resistors designated $R_B$ in FIG. 2 are biasing elements and are illustrated only by way of example.

Accordingly, the operation of the open loop control system depicted in FIGS. 1 and 2 is characterized by the rheostat 15 and outdoor sensor 20 having an equivalent linearly variable impedance. Accordingly, for the cycle selected by the timing circuit 33, such as 4 seconds out of every 30 seconds, the temperature without the space is sensed by the thermistor. If a change in temperature occurs, the impedance of the thermistor 21 is likewise changed, thereby changing the potential at the control input 23 of the operational amplifier 18. The operational amplifier compares the potential at the control input to the potential at the reference feedback input and if same are different, changes the potential at the output terminal 24. If the temperature detected by the thermistor increases, comparator 26 detects the rise in potential of the output terminal 24 and applies a signal through indicator lamp 28, thereby lighting same, to triac 29, thereby rendering the triac conductive to effect the application of a closing signal to the valve motor 12 to selectively close same. Similarly, if the output potential of the operational amplifier drops below the selected null voltage, the comparator 27 applies a signal through indicator lamp 30, thereby lighting same, to triac 31, thereby rendering same conductive to effect application of an opening signal to the valve motor 12 to thereby selectively open same. As indicated above, the opening and closing of the valve motor 12 effects a change in the position of the contact 14 of the rheostat and thereby changes the resistance of the rheostat by the same amount as the change in resistance in the thermistor to thereby bring the respective potentials at the reference feedback input and control input correspondence so that the null condition is once again established. This operation is repeated through each timing cycle, as determined by the timing circuit so that the operational amplifier is continually being brought into the null condition whereby the respective impedances seen by reference feedback input and control input are substantially the same.

Referring specifically to FIG. 2, an override circuit, generally indicated as 44, is illustrated. The override circuit includes a low impedance resistor $R_{MIN}$ in series with manually operated switch 41 coupled in parallel with the thermistor 21. By placing the manually actuated switch 41 is a closed position, the control input of the operational amplifier sees a reduced impedance caused by the parallel connection of the thermistor and $R_{MIN}$ and thereby drives the control valve motor in the same manner discussed above, to a closed position. Such an overridden position permits the entire automatic system to be overridden when sudden changes in temperature conditions or voltage surges in the system occur.

Accordingly, it is noted that the instant invention is characterized by an open loop heating control system for adjusting the rate at which heat is supplied to a space, such as a room, by detecting the temperature condition without space, by means of a substantially linearly variable temperature sensitive element having the same impedance characteristic as a rheostat coupled to the valve motor.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A heating control system for automatically controlling the temperature within a space comprising in combination; temperature sensing means for detecting changes in temperature without the space and in response thereto, producing a control signal having a substantially linearly variable potential, the increase or decrease in potential being linearly varied in response to changes in temperature without the space; heat supply means for supplying heat to the space at a set rate including control valve means adapted to be selectively opened to increase the set rate at which heat is supplied to the space and selectively closed to decrease the set rate at which heat is supplied to the space; rheostat means including a movable contact means coupled to said control valve means and disposably controlled thereby to produce a reference feedback signal having a linearly variable potential, said potential being linearly varied in response to the selective opening and closing of said control valve; comparator means for comparing the potential of said variable control signal to the potential of said variable reference feedback signal, said comparator means in response to the potential of said variable control signal being greater than the potential of said variable reference signal being adapted to apply a closing signal to said control valve means to effect decreasing of the rate at which same supplies heat to the space, said comparator means being further adapted in response to the potential of said control signal being less than said reference potential to apply an opening signal to said control valve means to effect an increase in the set rate at which heat is supplied to the space.

2. A heating control system as claimed in claim 1, wherein said temperature sensing means and said rheostat means have an equivalent substantially linearly variable impedance characteristic.

3. A heating control system as claimed in claim 1, wherein said temperature sensing means includes a thermistor and means for biasing said thermistor to effect a linearly variable change in the impedance of said thermistor in response to corresponding changes in the temperature sensed thereby.

4. A heating control system as claimed in claim 3, wherein said movable contact of said rheostat means is adapted to linearly vary the impedance thereof by an amount corresponding to the change in the substantially linearly variable impedance of the thermistor when same detects a change of temperature.

5. A heating control system as claimed in claim 1, wherein said comparator means includes operational amplifier means selectively disposable into a null combination for producing a predetermined potential output in response to the potential of said reference feedback signal and said control signal being substantially equivalent.

6. A heating control system as claimed in claim 5, wherein said operational amplifier means includes compensator means for selecting the output potential of said operational amplifier means to dispose same at a null condition.

7. A heating control system as claimed in claim 5, wherein said comparator means includes first and second comparators coupled to the output of said operational amplifier means, sais first comparator being adapted to detect when the output potential of said operational amplifier means is above the predetermined null condition potential and in response thereto produce a closing control signal, said second comparator being adapted to detect when the output potential of said operational amplifier means is below the predetermined null condition potential and in response thereto produce an opening control signal and circuit means intermediate said first and second comparators for respectively receiving said first opening control signal and closing control signal produced by said first and second comparators and in response thereto apply a closing signal to said control valve means in response to said closing control signal and apply an opening signal to said control valve means in response to said opening control signal.

8. A heating control system as claimed in claim 7, wherein said circuit means includes first and second power control means respectively coupled to said first and second comparator means, said first control means being adapted to receive said closing control signal in response thereto apply a closing control signal to said control valve means, said second control means being adapted to apply a closing signal to said control valve means, said second control means being adapted to receive said opening control signal in response thereto apply an opening signal to said control valve means.

9. A heating control system as claimed in claim 8, wherein said first and second power control means are triacs.

10. A heating control system as claimed in claim 8, and including first and second light indicating means, said first light indicating means being disposed intermediate said first comparator and first power control means for indicating the application of a closing control signal to said power control means, said second light indicating means being coupled intermediate said second comparator and second power control means for indicating the application of an open control signal to said second power control means.

11. A heating control system as claimed in claim 1, and including timing means coupled to said comparator means, said timing means permitting said comparator means to compare the potential of said variable control signal to the potential of said variable reference signal for a first predetermined interval of time and preventing said comparator means from comparing the potential of said variable control signal to the potential of said variable reference feedback signal for a second interval of time to thereby define a timing cycle for the comparator means.

12. A heating control system as claimed in claim 11, and including potential supply means for supplying an energizing potential, said timing means being disposed intermediate said supply means and said comparator means for selectively applying said energizing potential to permit said comparator means to compare the potential of said variable control signal to the potential of said variable reference feedback signal and for preventing application of said energizing signal to said comparator means to prevent the comparator means from comparing the potential of said variable control signal to the potential of said variable reference feedback signal.

13. A heating control system as claimed in claim 12, wherein said timing means includes a transistor switching means disposed intermediate said supply means and said comparator means, and a timer coupled to said switching transistor means for cyclically opening and closing said transistor switching means for a first interval of time and second interval of time respectively to thereby selectively couple said supply means to said comparator means for said first interval of time during each cycle isolate said supply means from said comparator means for a second interval of time during each cycle.

14. A heating control system as claimed in claim 1, and including override circuit means adapted to be selectively coupled in parallel with said temperature sensing means to thereby substantially reduce the potential of said control signal with respect to said reference signal to effect an application of said closing signal to said control valve means to effect decreasing of the rate at which heat is supplied to the space.

15. A heating control system as claimed in claim 14, wherein said override means include a manually operated switch in series with a resistor, operation of said manually operated switch effecting a parallel connection of said resistor and said temperature sensing means to thereby reduce the substantially linearly variable potential of the control signal applied to the comparator means.

* * * * *